April 20, 1948.    C. F. WAGNER ET AL    2,439,956
BUS BAR STRUCTURE
Filed July 7, 1944    3 Sheets-Sheet 2
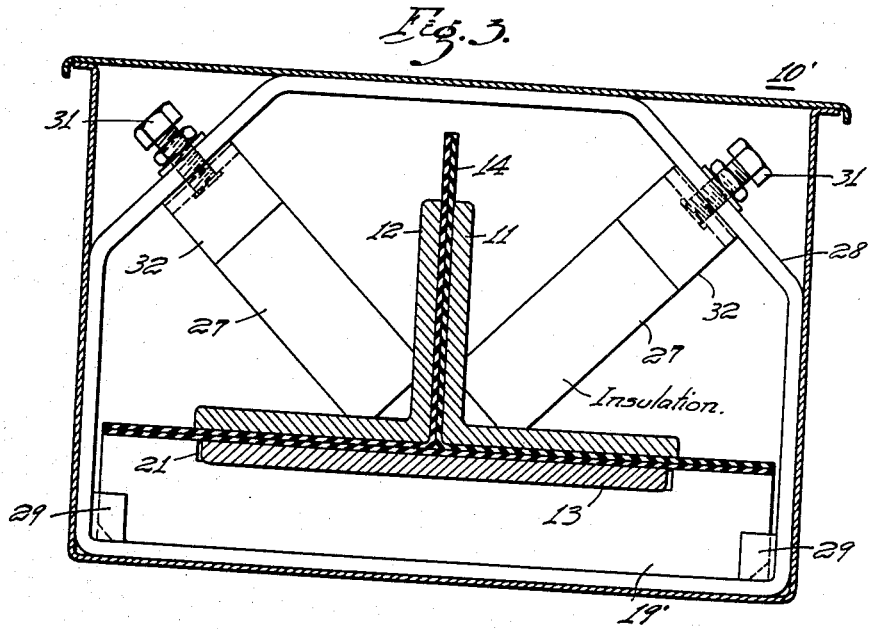
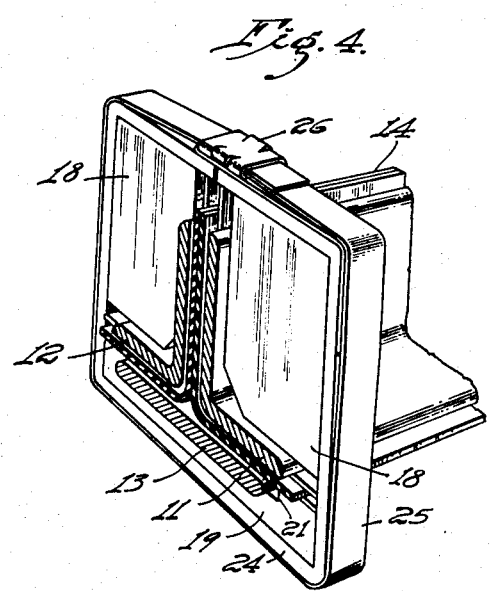

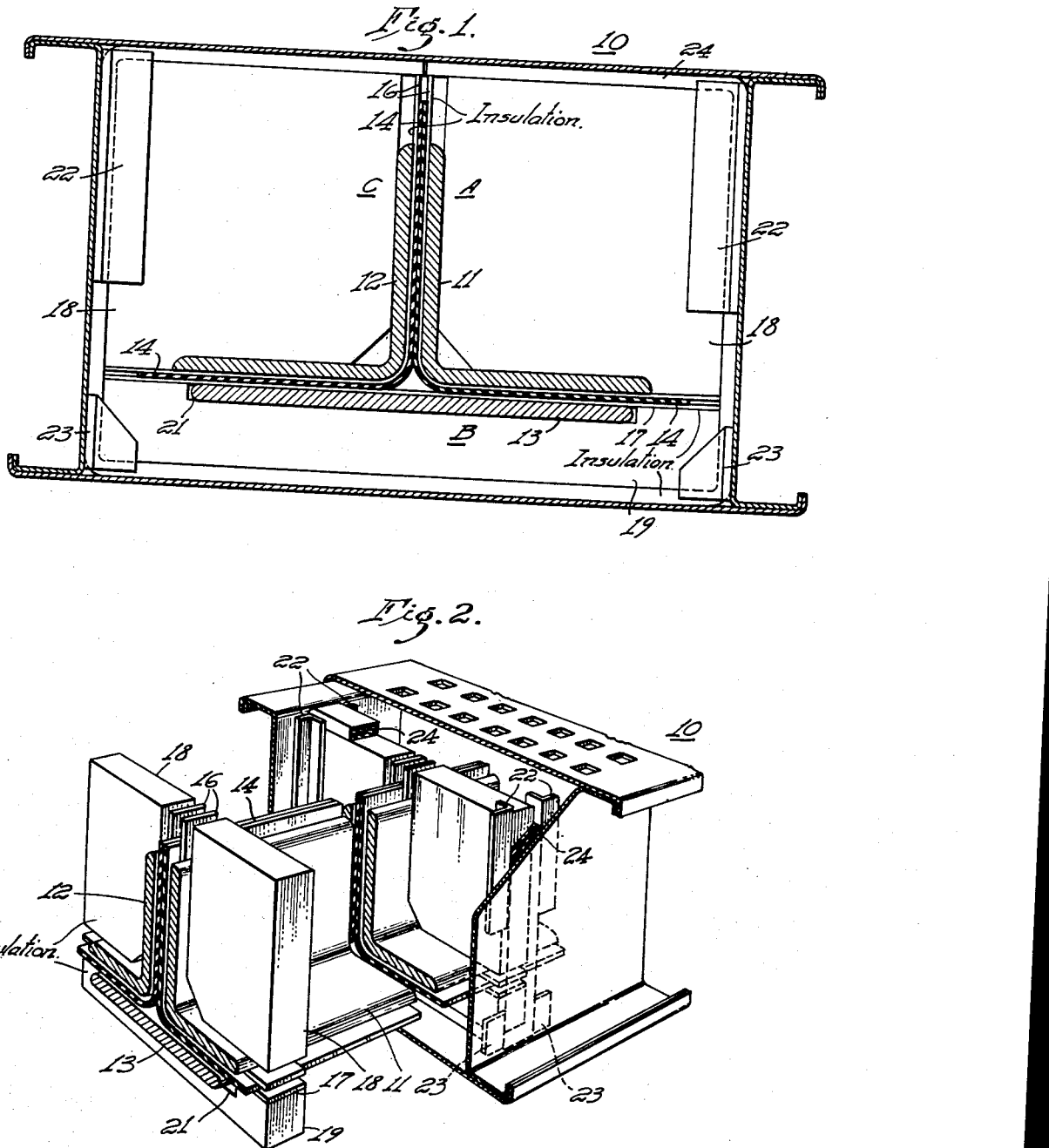

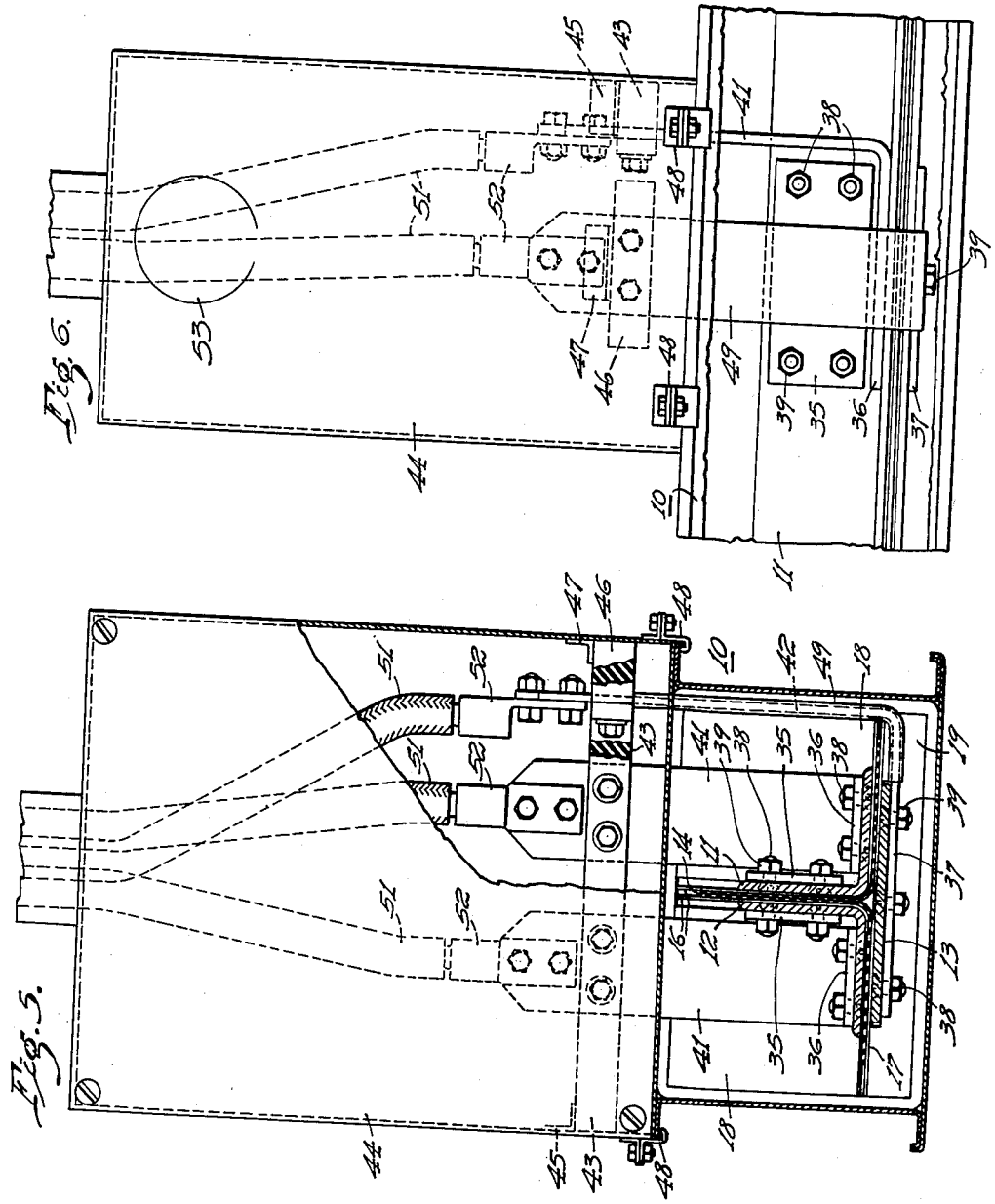

Patented Apr. 20, 1948

2,439,956

UNITED STATES PATENT OFFICE 2,439,956

BUS-BAR STRUCTURE

Charles F. Wagner, Swissvale, and Lawrence L. Fountain, Wilkinsburg, Pa., assignors to Westinghouse Electric Corporation, East Pittsburgh, Pa., a corporation of Pennsylvania Application July 7, 1944, Serial No. 543,936

5 Claims. (Cl. 174—99)

Our invention relates, generally, to electrical distribution systems and, more particularly, to bus-bar structures for use in such systems.

The transmission of power over bus bars, especially in amounts that involve high current densities, incurs certain objectionable features, such as, a high per cent voltage drop, unequal distribution of current in the bus bars with resulting excessive heating, inequality of currents in parallel conductors and unbalanced voltage drop. The foregoing conditions are true particularly when the standard flat spacing of bus bars is utilized.

Some attempts have been made to minimize the aforementioned objectionable features by resorting to close mutual coupling between the bus bars and correct currents in adjacent bars. In one known arrangement, paired phasing of bus bars is utilized whereby a pair of bus bars is required for each phase of a multi-phase system. Thus in a three-phase arrangement there are six bus bars and they are so arranged that bars from phases A and B, B and C, and C and A are paired together to secure the equivalent of a single-phase effect wherein the currents in the two paired bars are essentially 180° apart in phase position. The foregoing arrangement of bus bars has the disadvantage of requiring a large number of bus bars and a large amount of space.

In another arrangement, six bus bars are paired together in the foregoing manner but are arranged in a Y formation and are enclosed in a hexagonal housing instead of the usual rectangular housing. While this arrangement requires less space than the other, the housing and bus-bar supports are difficult and expensive to manufacture and assemble. Furthermore, it is difficult to make tap-off connections to the bus bars.

An object of our invention, generally stated, is to provide a bus-bar structure which shall be simple and efficient in operation, and which may be economically manufactured and installed.

A more specific object of our invention is to provide an enclosed multi-phase bus-bar structure that requires a relatively small amount of space.

Another object of our invention is to provide a multi-phase bus-bar structure having a low impedance and, therefore, a low voltage drop.

A further object of our invention is to provide an enclosed bus-bar structure which shall be capable of withstanding the stresses imposed thereon when conducting large amounts of current.

Still another object of our invention is to provide a simple and efficient means for supporting bus bars in an enclosing housing.

A still further object of our invention is to provide for making tap-off connections to an enclosed bus structure.

Other objects of our invention will be explained fully hereinafter or will be apparent to those skilled in the art.

In accordance with one embodiment of our invention, two right angle bars and a flat bar are disposed to form a T. Each angle bar and the flat bar may be connected to one of the three phases of a three-phase system. The bars are so disposed that approximately half of each bar is paired with half of a bar of a different phase, thereby obtaining the desired close mutual coupling with one another with a minimum number of bus bars.

For a fuller understanding of the nature and objects of our invention, reference may be had to the following detailed description, taken in conjunction with the accompanying drawings, in which:

Figure 1 is a view, in section, of a bus structure embodying the principal features of our invention;

Fig. 2 is a view, in perspective, of the bus structure shown in Fig. 1;

Fig. 3 is a view, in section, of a modification of our invention;

Fig. 4 is a view, in perspective, of a slightly modified form of the structure shown in Figs. 1 and 2;

Fig. 5 is a view, partially in end elevation and partially in section, showing a manner of making tap-off connections to the bus structure; and Fig. 6 is a view, in side elevation, of the structure shown in Fig. 5, a portion of the housing 10 being removed.

Referring to the drawings and, particularly, to Figs. 1 and 2, the structure shown therein comprises a rectangular housing 10, having right angle bus bars 11 and 12 and a flat bus bar 13 disposed within the housing to form a T. As shown, one leg of the right angle bar 11 is paired with one leg of the right angle bar 12. The other leg of the bar 11 is paired with one-half of the flat bar 13, and the other leg of the bar 12 is paired with the other half of the bar 13. Thus, when the bar 11 is connected to phase A of a three-phase system, the bar 13 is connected to phase B, and the bar 12, is connected to phase C, a mutual coupling is obtained which provides the desired equivalent of a single-phase effect without resorting to a larger number of bus bars.

The bars are preferably insulated from each other throughout their entire length by sheets of insulation 14. Additional strips of insulation 16 and 17 are also provided between the bars where they are supported in the housing 10.

As shown, the bars are supported at desired intervals throughout the length of the housing by a pair of rectangular insulating blocks 18, one of which engages the right angle bar 11, and the other of which engages the right angle bar 12, and a third rectangular block 19 which engages the flat bar 13. As shown most clearly in Fig. 1, the block 19 is provided with a recess 21 for the bar 13.

The blocks 18 may be retained in position in any suitable manner such as by angle members 22 secured to the side walls of the housing 10. Likewise, the block 19 may be retained in position by similar angle members 23, also secured to the side walls of the housing 10. The angle members 22 and 23 are so spaced that the blocks 18 and 19 slide into the housing between the angle members. A strip of felt 24 or other suitable material may be disposed between the blocks and the housing to provide a certain amount of resiliency in the support for the bus bars.

In this manner the bus bars are securely retained in position without requiring the supporting members to be bolted or otherwise secured to the bus bars. Furthermore, it is not necessary to bolt the supporting members to the housing, since they are merely wedged into position between the angle members on the side walls of the housing.

In order to increase the ability of the structure to withstand the forces produced by large amounts of current under short-circuit conditions, a metal band 25 or other suitable reinforcing member may be provided around each group of supporting blocks outside of the felt strip 24, as shown in Fig. 4. The band may be of a type utilized around packing cases, and it may be applied by means of a banding tool similar to those utilized for banding boxes. The ends of the band 25 may be secured together by a clip 26.

When the metal bands 25 are utilized, desired lengths of the bus bars may be assembled in a suitable jig with the supporting blocks 18 and 19 spaced at desired intervals along the bus bars, and the bands 25 applied. The assembled structure may then be dropped into an open length of the housing 10 after which the cover for the housing may be secured in place. In accordance with the usual practice, the bus-bar structure is manufactured in sections of a suitable length, and as many sections as are required are joined together in end-to-end relation.

As shown in Figs. 5 and 6, the bus bars 11, 12 and 13 of adjoining sections may be joined together by a plurality of fish plates 35, 36 and 37 which are secured to the bars by countersunk bolts 38 having hexagonal nuts 39. When it is desired to make tap-off connections to the main bus, fish plates 36 having vertical risers 41 thereon may be connected to the angle bars 11 and 12 and a plate 37 having a side extension and riser 42 may be connected to the bar 13.

The risers 41 may be retained in position by an insulating support 43 which may be mounted in a housing 44 on angle brackets 45. The riser 42 may be secured to an insulating support 46 mounted on an angle bracket 47. The housing 44 may be removably attached to the bus-bar housing 10 by clips 48. The riser 42 should be protected by an insulating sleeve 49 in view of its nearness to the side of the housing 10.

A cable 51 may be attached to each of the risers 41 and 42 by means of suitable connectors 52. The cables 51 may extend through the top of the housing 44, as shown, or through a side of the housing, if desired. Suitable knockouts 53 may be provided in the sides of the housing 44, as well as in the top, and the proper one removed when the cables 51 are connected.

In the modification of the invention shown in Fig. 3, the bus bars 11, 12 and 13 are arranged in the same manner as in Figs. 1, 2 and 4, and the bar 13 is supported by a rectangular block 19' similar to the one hereinbefore described. The bars 11 and 12 are each wedged into position by a rectangular block 27. As shown, the blocks 19' and 27 are disposed inside of a metal frame 28 which in turn is mounted inside of a rectangular housing 10' similar to the housing 10. The block 19' rests upon the bottom of the frame 28 and may be secured in position by suitable members 29 at the lower corners of the frame.

As shown, the blocks 27 are disposed at such an angle as to provide maximum resistance to the forces exerted during short-circuit conditions. These blocks 27 are tightly wedged between the angle bars and the frame by means of adjusting screws 31. A metal cup 32 may be provided on the end of each block 27 for receiving the end of the adjusting screw 31. In this manner it is not necessary to provide an opening in the insulating block 27 for receiving the adjusting screw, and the metal cup 32 reinforces the end of the insulating block. The metal frames 28 may be placed at desired intervals throughout the length of the bus-bar structure to afford the necessary support. It is apparent that the structure disclosed in Fig. 3 is capable of withstanding severe stresses, such as those encountered during short-circuit conditions.

From the foregoing description, it is evident that the multi-phase bus-bar structure, herein described, has the advantage of securing a low impedance with a resultant low voltage drop without resorting to the large number of bars required in previously known forms of interlaced bus-bar arrangements. It also has the advantage of a paired phase arrangement and at the same time requires only one conductor per phase. The structure may be readily assembled in a rectangular housing which may be easily manufactured, and, since only three conductors are utilized, tap-off power connections may be readily made.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. A multi-phase bus structure comprising, a pair of right angle bars and a flat bar disposed in a T formation, insulating means disposed between said bars, a substantially rectangular housing enclosing said bars, substantially rectangular insulating blocks slidably disposed in said housing and directly engaging said bars to support and retain them in position, said insulating blocks being detached from said bars, and means on the inside walls of the housing for retaining said blocks in position.

2. A multi-phase bus structure comprising, a pair of right angle bars and a flat bar disposed in a T formation, insulating means disposed between said bars, a rectangular housing enclosing said bars, substantially rectangular insulating blocks slidably disposed in said housing to support the bus bars in the housing, and means on the inside walls of the housing for retaining the blocks in position.

3. A multi-phase bus structure comprising, a pair of right angle bars and a flat bar disposed in a T formation, the width of said flat bar being substantially equal to the width of two legs of the angle bars, insulating means disposed between said bars, a housing enclosing said bars, additional insulating means directly engaging the bars and slidably disposed in said housing for supporting and retaining said bars in position, said additional insulating means being detached from said bars, and means secured to the inside walls of the housing for retaining said additional insulating means in position.

4. A multi-phase bus structure comprising, a pair of right angle bars and a flat bar disposed in a T formation, the width of said flat bar being substantially equal to the width of two legs of the angle bars, insulating means disposed between said bars, additional insulating means directly engaging the bars for supporting and retaining said bars in position, a substantially rectangular housing enclosing said bars and said insulating means, said additional insulating means being detached from said bars, and means secured to the inside walls of the housing for retaining said additional insulating means in position, said additional insulating means being slidably disposed between the means secured to the walls of the housing.

5. A multi-phase bus structure comprising, a pair of right angle bars and a flat bar disposed in a T formation, insulating means disposed between said bars, a substantially rectangular housing enclosing said bars, insulating blocks slidably disposed in said housing and directly engaging said bars to retain them in position, said insulating blocks being detached from said bars, and means on the inside walls of the housing for retaining said blocks in position.

CHARLES F. WAGNER.
LAWRENCE L. FOUNTAIN.

REFERENCES CITED

The following references are of record in the file of this patent:

UNITED STATES PATENTS

| Number | Name | Date |
|---|---|---|
| 1,851,940 | Williams | Mar. 29, 1932 |
| 2,124,269 | Anderson | July 19, 1938 |
| 2,262,067 | Togesen et al. | Nov. 11, 1941 |
| 2,287,502 | Togesen et al. | June 23, 1942 |
| 2,288,078 | Fisher et al. | June 30, 1942 |
| 2,320,093 | Moore | May 25, 1943 |
| 2,341,841 | Carlson | Feb. 15, 1944 |
| 2,356,006 | Samer | Aug. 15, 1944 |
| 2,400,223 | Cole | May 14, 1946 |

FOREIGN PATENTS

| Number | Country | Date |
|---|---|---|
| 517,209 | Great Britain | Jan. 23, 1940 |